2,863,783

NACREOUS MATERIAL FROM GLASS

Leon M. Greenstein, New York, N. Y., assignor to Francis Earle Laboratories, Inc., Peekskill, N. Y., a corporation of New York No Drawing. Application November 15, 1956
Serial No. 622,288

14 Claims. (Cl. 106—148)

This invention relates to the utilization of platelets or lamellae of glass in nacreous compositions.

Nacreous preparations are used to impart a pearly or mother-of-pearl appearance to various objects. For example, simulated pearls are manufactured by coating glass or plastic beads with a suspension of nacreous pigment in an appropriate vehicle, such as cellulose nitrate lacquer. Simulated mother-of-pearl knife handles and fountain pen barrels can be made by incorporating nacreous pigment in a plastic, such as cellulose acetate, which is then molded into the appropriate shape. Pearl sheets are made by casting polymerizable resins, such as acrylic or polyester resins, in which nacreous pigments are suspended; the sheets can be cut into disks for the manufacture of simulated pearl buttons.

A widely used nacreous pigment is Pearl Essence, which is a suspension of the plate-like guanine crystals derived from certain fish scales. Other nacreous pigments consists of suspensions in suitable vehicles of crystals of lead hydrogen phosphate or basic lead carbonate.

These materials all have certain physical characteristics in common: They consist of transparent or translucent plate-like crystals, two microns or less in thickness, which have high indices of refraction, and which, to be of practical use, are relatively insoluble in water and in the organic liquid compositions utilized in plastics work. They also should have melting or decomposition points which are high in comparison with the temperature encountered in plastics processing.

When such crystals are incorporated in a transparent or translucent base and oriented into parallel layers, light is reflected simultaneously in a given direction from a multitude of surfaces, producing the type of luster which is characterized as pearly. The orientation is made possible by the plate-like character of the crystals. Inasmuch as the intensity of the reflectance at a boundary between two transparent substances depends on the difference in index of refraction, it is necessary that the index of refraction of the crystal deviate from that of the medium. Generally a suitable nacreous effect begins to appear when the index of refraction of the medium and that of the crystal differ by approximately 0.2 and improves as the difference increases.

In practice the commonly used resins and plastics have indices of refraction close to the range 1.50 to 1.60, and the nacreous crystals have indices above 1.70. The indices for lead hydrogen phosphate crystals, for example, are 1.86, 1.83 and 1.81, while those for basic lead carbonate crystals are 2.09 and 1.94.

In accordance with the present invention, it has been found that glass platelets may be made to give a nacreous effect and that such a nacreous material will have many advantages over the conventional crystalline nacreous products, having lower solubility in most solvents and chemicals, higher stability at elevated temperatures, and less sensitivity to methods of handling.

Accordingly, it is an object of the present invention to provide a nacreous material of glass having desirable physical and chemical properties, not heretofore attainable in prior art compositions.

Another object of this invention is to provide a nacreous coating or other nacreous composition utilizing glass platelets.

Another object is to provide a resinous body or other article of manufacture having incorporated therewith a nacreous composition utilizing glass platelets.

Still another object of the present invention is to provide a method for preparing a nacreous composition of glass platelets.

These and other objects of the present invention will become more apparent when taken in connection with the following description.

By the formation of the glass particles of the present invention, it has been demonstrated that the nacreous effect can be obtained without the use of crystalline materials, so long as the individual particles are sufficiently thin platelets with a suitable index of refraction. Various glass compositions were converted into lamellae of dimensions similar to those of the nacreous crystals hereinbefore referred to. When incorporated in a vehicle, these glass platelets had a pearly luster like that of the known nacreous pigments. The usual pearly effects were obtained both by coating surfaces with these platelets and also by incorporating the platelets in transparent plastic compositions.

A convenient method for forming the flakes involves first blowing extremely thin films of the appropriate glass. The film thickness should be 2 microns or less and is of the correct order of magnitude if the films show interference colors, although film just below and just above this thickness is within the desired thickness range.

To convert the film to platelets, it is suspended in water or other liquid, and agitated violently, or ground in any suitable device, such as a ball mill. Samples are withdrawn from the suspension at frequent intervals (perhaps only 30 seconds apart) and examined by means of the microscope to determine the size of the fractured particles. The process is stopped when the glass film has been reduced to platelets whose long dimension falls preferably between 2 and 100 microns. It is further desired that the ratio of length to thickness be at least 4. Thus, particles of 2 microns length are suitable if they are 0.5 micron or less in thickness, but platelets 2 microns thick should be at least 8 microns long. Although lengths of 2 to 100 microns produce optimum luster, lamellae which are even smaller than 2 microns in length are suitable if the particles are thin enough, the main criterion being that the particles remain platelets, which, as indicated above, may be considered to be the case if the ratio of length to thickness is 4 or greater. If during the fracturing process some small particles with a lower ratio of length to thickness are produced, they dilute but of course do not destroy the nacreous effect of the more desirable platelets.

Platelets longer than 100 microns also produce pearly luster, but are less desirable for many purposes because individual particles can be detected by the eye, giving a discontinuous optical effect.

The resulting suspension of glass platelets has the typically silky appearance of nacreous suspensions. It is heterogeneous with respect both to platelet area and platelet thickness. If desired, the lamellae can be fractionated into more uniform size ranges by settling and decantation or by centrifuging. The thinner particles, which are the most lustrous per unit weight of glass since they present the greatest number of reflecting surfaces, are very well suited to application like the surface coating of simulated pearls, while the somewhat thicker platelets are preferable in plastic molding operations where the greater rigidity of the particles prevents their being fractured further by agitation in the viscous molten plastic.

In another method for producing the platelets the glass is formed into a foam with extremely thin walls by the use of internal blowing agents.

The foamed glass, as prepared above, is fractured as described above, and fractionated to give particles of the desired dimensions. Other methods of preparing the thin film would include well known extrusion and calendering techniques.

The properties of the glass lamellae are further and more specifically illustrated in the following examples:

Example I

A flint glass with the composition 35.40 percent $SiO_2$
5.16 percent $K_2O$
59.10 percent PbO
0.34 percent $As_2O_3$ and the index of refraction $n_D = 1.70$ was blown into thin film less than 2 microns in thickness. The film was dispersed in butyl acetate and was then fractured by agitation to give particles with an average length of 35 microns. The platelets were permitted to settle out of the butyl acetate, which was decanted for further use, leaving a paste consisting of 25 percent glass in butyl acetate. To 4.0 parts of this paste were added 96.0 parts of a lacquer consisting of 8.0 percent cellulose nitrate (15–20 seconds) in butyl acetate. The resulting pearl lacquer was then used for coating alabaster glass beads by dipping.

In the above example, it is to be noted that the nacreous comprises 25 percent by weight of the paste composition. Actually this composition may vary in accordance with the convenience of the user, so that the dsired ultimate pigment concentration in the final coating composition is in the range of about 0.25 percent to 5.0 percent.

Exmaple II

Glass film 2 microns or less in diameter was prepared as in Example 1. The film was taken up in water and ground to particles with an average length of 15 microns. The lamellae were settled out of the water, which was decanted, and the resulting paste was dried. Two parts of the dry pearl platelets were mixed with 198 parts of methyl methacrylate molding powder. The mixture was then extruded to produce a simulated mother-of-pearl rod.

Example III

A glass consisting of 90.8 percent $Sb_2O_3$ and 9.2 percent $B_2O_3$, $n_D = 1.95$, was blown and fractured as described above, using styrene as the grinding liquid. The resulting suspension had an average particle length of 25 microns. The lamellae were fractionated (by settling) into one portion consisting largely of the thicker platelets, and a second which contained the relatively thinner particles. A quantity of glass-styrene paste containing 1.0 part of glass, from the thinner fraction, was diluted to a total of 100 parts with polyester casting resin, and the mixture cast to produce a pearl sheet suitable for cutting into polyester pearl buttons.

A similar quantity of the thicker platelets were dried and the glass was then added to 99 parts of polystyrene molding powder, which was injection molded to make polystyrene pearl articles.

Example IV

Glass lamellae were produced by foaming a glass of the composition with 11.7 percent $SiO_2$
1.7 percent $Na_2O$
86.6 percent PbO with $n_D = 2.08$. The foam was broken up and milled to produce platelets of the dimensions given above.

Example V

Glass lamellae were prepared in accordance with Example I from a glass of the composition 20.1 percent $SiO_2$
29.5 percent $Na_2O$
50.4 percent $TiO_2$ with $n_D = 1.80$.

The glass lamellae which have been described have many advantages over the crystals which have been used heretofore in the production of nacreous effects. They are stable to acid solution and thus are not affected by free acid in polyester casting resin as, for example, basic lead carbonate may be. Although glass compositions are subject to some attack by alkaline solutions, they are nevertheless much more stable to alkali than are the crystalline substances previously used, and thus can be cast in alkaline melamine solutions. The use of the conventional nacreous crystals in incorporation in plastic molding powders requires great care to avoid over-heating the material with subsequent decomposition or discoloration of the crystals. The glasses have softening temperatures which are so high they may be used without difficulty in applications of this type.

Moreover, it has not been possible to date to prepare the conventional nacreous pigments in the form of dry powders without some loss in quality, usually caused by the agglomeration of many platelets into ill-defined clumps. The glass platelets which have been described do not have this tendency, and can, therefore, be converted with ease to dry preparations for those applications in which dry materials are to be preferred. In general this applied for the most part to uses in which the nacreous material is blended with plastic molding powders.

The glass platelets may also be used in casein plastics. In this case, the presence of organic solvents is not necessary and it is most convenient to prepare the nacreous pigment in the form of an aqueous paste. Generally the desired effects are obtained when the concentration of glass crystals is one-half percent to five per cent of the weight of the casein.

In the foregoing, the present invention has been described only in connection with preferred embodiments thereof. Many variations and modifications of the principles of my invention within the scope of the description herein are obvious. Accordingly, the invention is to be limited not by the specific disclosure herein, but only by the appending claims.

I claim:

1. A nacreous composition having, as a nacre-producing substance therein, glass platelets of a thickness not greater than 2 microns and an average ratio of length to thickness of at least four.

2. A nacreous composition having, as a nacre-producing substance therein, glass platelets of a thickness not greater than 2 microns, an average ratio of length to thickness of at least four, and an index of refraction of at least 1.70.

3. A nacreous composition having, as a nacre-producing substance therein, glass platelets of a thickness not greater than 2 microns, lengths between 2 and 100 microns, an average ratio of length to thickness of at least four, and an index of refraction of at least 1.70.

4. A nacreous composition comprising a light transmitting supporting medium, having suspended therein a nacre-producing substance comprising, a plurality of glass platelets of a thickness not greater than 2 microns, an average ratio of length to thickness of at least four, and an index of refraction at least 0.2 greater than that of the said supporting medium.

5. A nacreous composition comprising a light transmitting supporting medium, having suspended therein a nacre-producing substance comprising, a plurality of glass platelets of a thickness not greater than 2 microns, lengths between 2 and 100 microns, an average ratio of length to thickness of at least four, and an index of refraction at least 0.2 greater than that of the said supporting medium.

6. A nacreous composition consisting essentially of a film-forming, light transmitting lacquer having suspended therein, as a nacre-producing substance, flat glass platelets of a thickness not greater than 2 microns, an average ratio of length to thickness of at least four, and an index of refraction of at least 1.70.

7. The composition of claim 6 in which the lacquer consists essentially of a cellulose nitrate film-former and a butyl acetate solvent.

8. A nacreous composition comprising a paste-like water suspension of flat glass platelets having thicknesses of 2 microns or less, an average ratio of length to thickness of at least four, and an index of refraction of at least 1.70, said platelets being suspended in an aqueous medium.

9. A nacreous coating composition, having as a nacre-producing substance therein, a suspension of glass platelets having thicknesses of 2 microns or less, an average ratio of length to thickness of at least four, lengths of from 2 to 100 microns, and an index of refraction of at least 1.70, said nacreous composition being suspended in a light transmitting organic resinous material having an index of refraction at least 0.2 less than that of the said glass platelets.

10. A light-transmitting, nacreous plastic article of manufacture having suspended therein as the nacre-producing substance therein glass platelets having an average ratio of length to thickness of at least four, a thickness of 2 microns or less and an index of refraction of at least 1.70, said index of refraction being at least 0.2 greater than that of the plastic.

11. The article of claim 10 in which the plastic material is from the group consisting of acrylic resins, polyester resins and casein resins.

12. The method of preparing nacre-producing glass platelets which comprises blowing a glass having an index of refraction of at least 1.70 into a thin film not greater than 2 microns in thickness, fracturing said glass by agitation in a film-forming liquid, separating said glass from the bulk of said liquid and with the remainder of said liquid forming a nacreous paste containing suspended particles of said glass which have an average ratio of length to thickness of at least four.

13. The method of preparing nacre-producing glass platelets which comprises blowing a glass having an index of refraction of at least 1.70 into a thin film not greater than 2 microns in thickness, fracturing said glass by agitation in a liquid suspending medium until platelets are formed having lengths between 2 and 100 microns, and an average ratio of length to thickness of at least four, removing at least a portion of the liquid suspending medium from the glass platelets and then suspending the said platelets in a light transmitting liquid medium, which will, upon solidifying, provide a light transmitting support having an index of refraction at least 0.2 less than that of the said glass platelets.

14. The method of claim 13 in which the liquid suspending medium is water.

References Cited in the file of this patent

UNITED STATES PATENTS

| | | |
|---|---|---|
| 2,266,638 | Hauser | Dec. 16, 1941 |
| 2,308,409 | Wenzel | Jan. 12, 1943 |
| 2,363,570 | Caprio | Nov. 28, 1944 |
| 2,597,562 | Blodgett | May 20, 1952 |
| 2,601,123 | Moulton | June 17, 1952 |